United States Patent [19]

Inada

[11] Patent Number: 5,523,952
[45] Date of Patent: Jun. 4, 1996

[54] PRODUCTION PROGRESS CONTROL METHOD

[75] Inventor: Masayoshi Inada, Kumamoto, Japan

[73] Assignee: NEC Corporation, Tokyo, Japan

[21] Appl. No.: 974,401

[22] Filed: Nov. 12, 1992

[30] Foreign Application Priority Data

Nov. 12, 1991 [JP] Japan ................. 3-295323

[51] Int. Cl.[6] .................................................. G06F 19/00
[52] U.S. Cl. ........................................... 364/468; 364/401
[58] Field of Search .............................. 364/468, 401, 364/402, 403, 478, 474.11

[56] References Cited

U.S. PATENT DOCUMENTS 4,958,292  9/1990  Kaneko et al. ................. 364/468
5,164,905  11/1992  Iwasaki et al. ................. 364/468
5,255,181  10/1993  Chapman et al. .............. 364/401

*Primary Examiner*—Joseph Ruggiero

[57] ABSTRACT

A production progress control method is for controlling priorities for the progress of production lots among those lots in progress. Each step has a standard working time and each production lot has a processing procedure and a target process period. An expected passage time is calculated for each production lot based on both the standard working time and the target process period and a processing delay process start time is calculated from the difference between the process start time of a current lot in process and the expected target passage time. The highest priority is given to the production lot having the longest processing delay.

2 Claims, 3 Drawing Sheets

FIG. 1A PRIOR ART

| LOT NOs. | PRIORITY RANKS |
|---|---|
| ABCD-0001 | 2 |
| ABCD-0002 | 1 |
| EFGH-0100 | 3 |
| EFGH-0101 | 2 |
| PQRX-0200 | 1 |
| ⋮ | ⋮ |

| LOT IN PROCESS NOs. | PRIORITY RANKS |
|---|---|
| ABCD-0002 | 1 |
| ABCD-0001 | 2 |
| EFGH-0101 | 2 |
| EFGH-0100 | 3 |

(k)

STEP A
STEP B
STEP C
STEP X

FIG. 2A
|  | STANDARD TIME |
|---|---|
| STEP 1 | 1h14m |
| STEP 2 | 0h30m |
| STEP 3 | 2h45m |
| STEP 4 | 6h08m |
| STEP 5 | 1h24m |
(a)
FIG. 2B
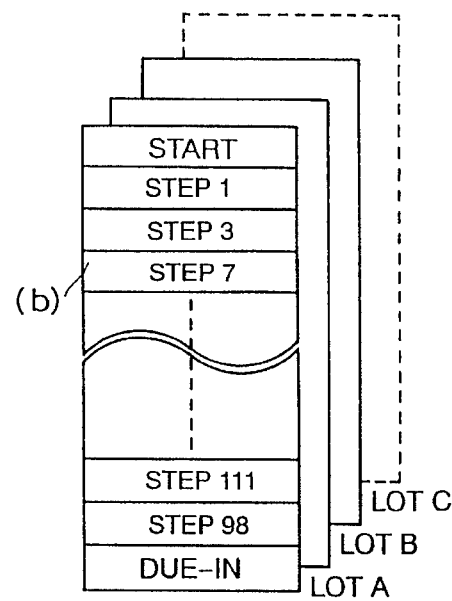
FIG. 2C
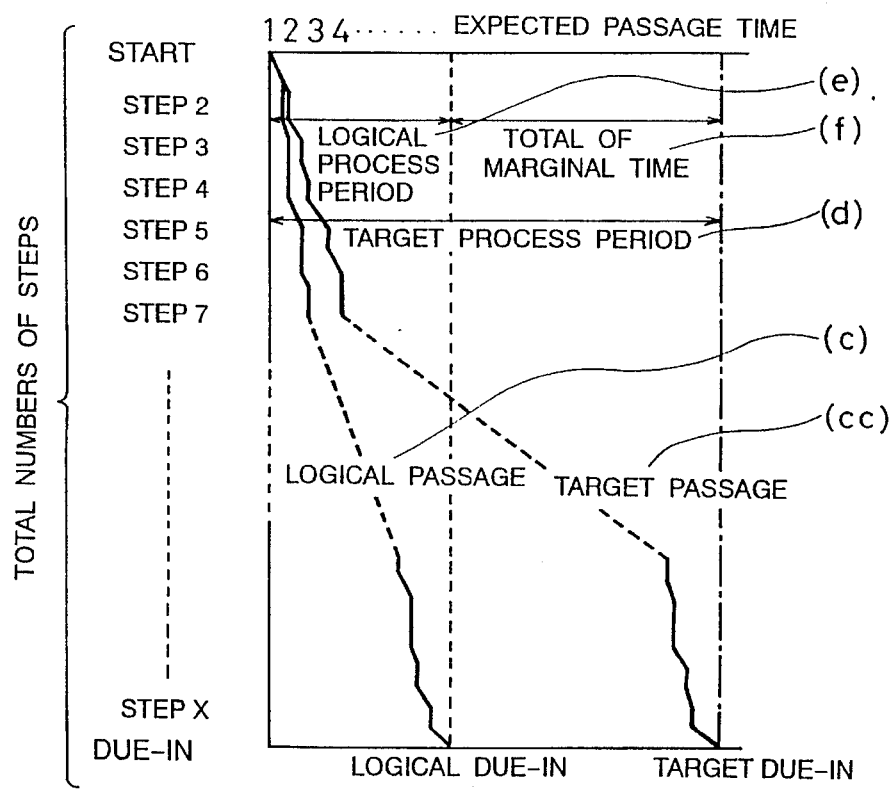

PRODUCTION PROGRESS CONTROL METHOD

BACKGROUND OF THE INVENTION (1) Field of the Invention

The present invention relates to a production progress control method for a process such as the fabrication of semiconductor devices, and more particularly to a method for controlling the progress of a plurality of production lots.

(2) Description of the Related Art

Conventionally, a production progress controlling is effected based on a priority rank table (j) for lots, as shown in FIG. 1A, which table relates to priority ranks assigned to the respective lots and also an in-process lot table (k) for each step, as shown in FIG. 1B, which table relates to the sequence of the priority ranks for lots in each of the steps.

In the conventional method, the above priority ranks are used as data for con%rolling the production progress. For each of the steps A, B, C, . . . X, the lots are arranged in the sequence of their priority ranks and this provides the process start lot table as Shown in FIG. 1B. Based on this table, instructions are given to a person engaged in the work or a transfer control system for carrying out the work in the sequence of priority ranks (in the present example, in the sequence in which the number of priority ranks increases).

In the conventional production progress control method described above, the process period required for the completion of a given lot is not taken into account as data for determining the priority ranks, so it is not possible to designate a targeted due-in date and time (i.e., date and time for completion) for each of the lots at the start of the work. A further problem is that, in order to change the targeted due-in date and time, it is necessary to adjust the progress speed of the lots by changing priority levels at each occasion, which results in an increase in steps or man-hours in the lot progress control.

SUMMARY OF THE INVENTION

It is, therefore, an object of the present invention to overcome the problems existing in the conventional production progress control method and to provide an improved method which operates in such a way that, among the plurality of lots in process, those which are delayed starting the process with respect to the expected target passage-time are caused to take higher process priorities.

According to one aspect of the invention, there is provided a method for controlling priorities for the progress of production lots among those lots which are in progress, comprising the steps of:

provifing each production step with a standard working time and providing each production lot with a predetermined sequential production steps end a target process period;

calculating expected target passage times of the predetermined sequential production steps of the production lot based on the target process period and the standard working time of each of the predetermined sequential production steps;

calculating a delay time by the difference between an actual process-start time of a current lot in process and the expected target passage times; and determining the priorities among the lots using the delay time as a factor for the determination.

BRIEF DESCRIPTION OF THE DRAWINGS

The above and other objects, features and advantages Of The present invention wall be apparent from the following description of a preferred embodiment of the invention explained with reference to the accompanying drawings, in which:

FIGS. 1A and 1B are tables showing a method of determining the priority ranks in a conventional production progress control method; and FIGS. 2A, 2B, 2C, 2D and 2E are tables and diagrams for the explanation of a method of determining the priority ranks in an embodiment according to the present invention.

A method step of obtaining the target passage time (cc) is as follows: The point of the target passage time of the first step falls at the point where the divided marginal time is added to the standard working time (a) of the first step. The second step starts from the target passage time of the first step, and the point of the target passage time of the second step falls at the point where the divided marginal time is added to the standard working time of the second step. The repetition of this procedure provides the target passage time leading to the target due-in.

DESCRIPTION OF THE PREFERRED EMBODIMENT

Now, a preferred embodiment according to the invention is explained with reference to the appended drawings.

FIGS. 2A through 2E show in tables and diagrams an example which embodies the present invention for the production progress control method.

Each step has its own standard working time (a) as given in FIG. 2A and each production lot has a processing procedure (b) in which a plurality of steps are sequentially arranged from the start to the product due-in as shown in FIG. 2B. FIG. 2C is a diagram for a process passage-time schedule for each of the production lots. For each of the lots, a target process period (d) covering the time period from the start to the product due-in is set at the start. Next, the standard working times for all of the steps (b) given in the FIG. 2B table are summed up, whereby a logical process period (e) is obtained. The logical process period (e) provides logical passage time (c) leading to a logical due-in, as shown in FIG. 2c. Then, a marginal time (f) is calculated by subtracting the logical process period (e) from the target process period (d). The marginal time (f) thus calculated is divided by the total number of steps end then inserted amongst the respective steps as change-over and stand-by times, whereby a target passage-time (cc) leading to a target due-in is obtained. The process passage schedule as shown in FIG. 2C is prepared for each of the production lots. The expected target passage time 1 2 3 4 . . . is shown on the abscissa of the graph of FIG. 2c.

Figure 2D:
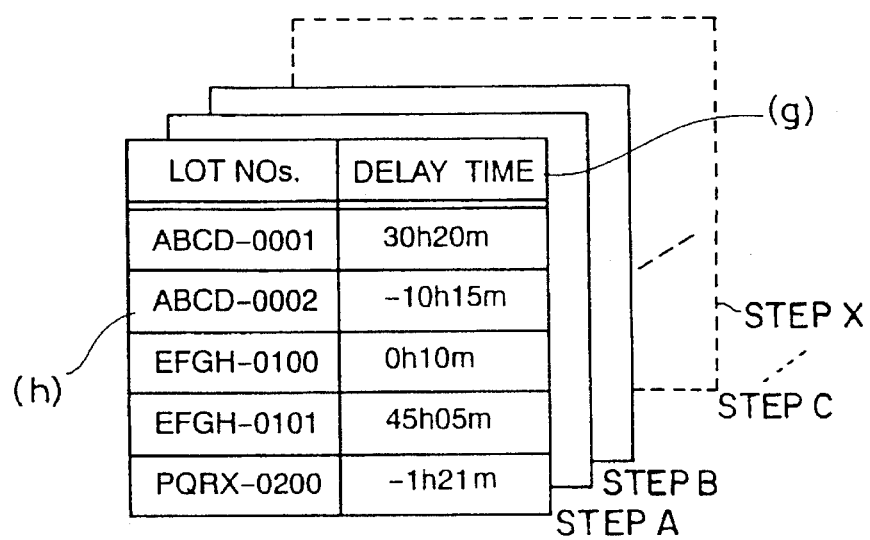
Figure 2E:
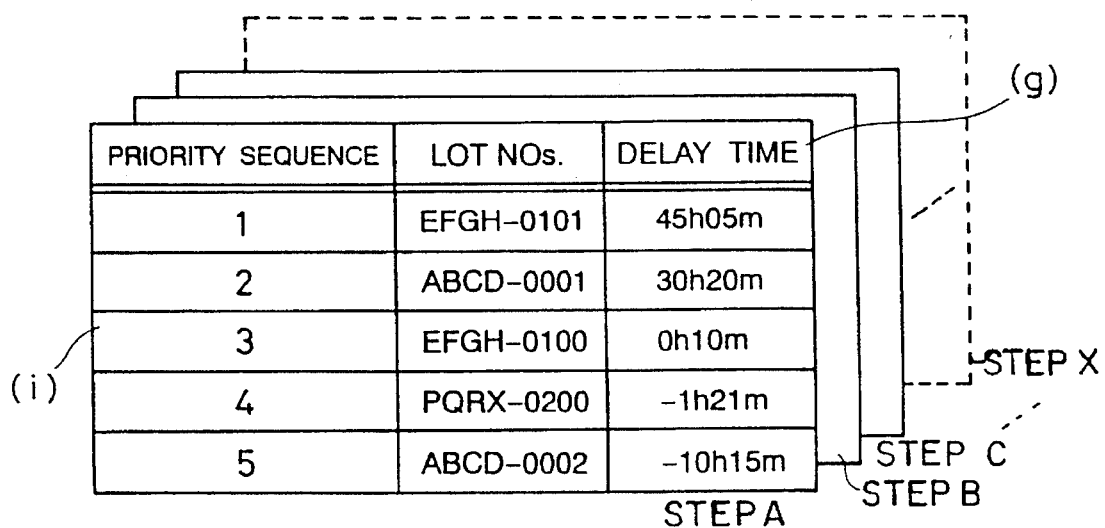

Now, a method as to how the priorities among the to-be-processed lots for each of the steps are determined is explained. For each of the lots in which the given process has started, by making reference to the expected passage-time in the process passage-time Schedule of FIG. 2C, a delay time (g) as shown in FIG. 2D is calculated from the difference between the actual process start time of e lot currently in process and the expected passage time of that lot in the process passage-time schedule of FIG. 2(C). FIG. 2D shows a table (h) of the lots (h) in process with a delay time (g) for each of the lots. In FIG. 2E, the lots shown in FIG. 2D are rearranged in a sequence in which the length of the delay time decreases starting from the longest delay. Thus, FIG. 2E provides a table of the lots in process in the sequence of delays and hence in the sequence of priorities (i). Unlike the conventional method, the method according to the present invention utilizes the delay time for each of the lots as a factor for determining the priorities for the processes involved.

As explained above, according to the invention, the delay time for each of the lots is calculated by working out an expected passage time for each of the steps based on a target process of the lot end a standard working time for each of the steps and by taking the difference between the actual process start time end the expected passage time of each of the lots in process. Due to this arrangement, it is possible to have the process advanced by giving the highest priority to the most delayed lot among a plurality of lots in process within each of the steps.

The invention thus facilitates the production progress control for processes carried out with a target process period set from the start to the product due-in date and time end this control does not require any changing of priority levels for the production progress of each of the lots. That is, all that is needed is to set the desired due-in date and time at the start and the priorities of processes up to the product due-in are automatically controlled by the system.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A method for controlling priorities for the progress of production lots among those lots which are in progress, the method comprising the steps of:

forming a standard working time table (a) in which a standard working time for each production step is given;

providing, for each of said lots, a sequential production step table (b) in which a plurality of sequential production steps are given, each of said sequential production steps covering a period from a process starting time to a product due-in time;

providing, for each of said lots, a process passage-time schedule table which includes a target process period (d) set as a target from said process starting time to said product due-in time, a logical process period (e) which sums up said standard working time for each production step, and a total of marginal time (f) which is calculated by subtracting said logical process period (e) from said target process period, said total of marginal time (f) being divided by the number of the production steps and the resulting divided marginal time being inserted between respective production steps to obtain a target passage time (cc);

forming a delay time table (g) in which a delay time is given for each of the lots calculated from a difference between an actual passage time of a current lot in process and said target passage time (cc);

providing a priority sequence table (i) in which priorities are given in sequence of delays amount the lots, based on said delay time table; and using said sequence of delays as a factor for priority determination in controlling the progress of the production lots.

2. A method according to claim 1, in which said marginal time in said process passage-time schedule table is calculated by taking into consideration change-over and stand-by times between respective production steps.

* * * * *